United States Patent [19]

Ginzel et al.

[11] Patent Number: 5,293,154

[45] Date of Patent: Mar. 8, 1994

[54] CENTER JUSTIFIED GAUGE

[75] Inventors: Geoffrey D. Ginzel, Peoria; Ricky D. Vance, Washington, both of Ill.

[73] Assignee: Caterpillar Inc., Peoria, Ill.

[21] Appl. No.: 945,462

[22] Filed: Sep. 16, 1992

[51] Int. Cl.$^5$ .............................................. B60Q 1/00
[52] U.S. Cl. .................................. 340/438; 340/459; 340/461; 340/525
[58] Field of Search ............... 340/438, 459, 461, 517, 340/525, 754, 753; 364/424.03, 141

[56] References Cited

U.S. PATENT DOCUMENTS

| | | | |
|---|---|---|---|
| 3,866,166 | 2/1975 | Kerscher, III et al. | 340/52 F |
| 4,038,756 | 8/1977 | Smith et al. | 33/172 E |
| 4,197,650 | 4/1980 | Bailey et al. | 33/143 L |
| 4,551,801 | 11/1985 | Sokol | 364/424 |
| 4,688,029 | 8/1987 | Kawasaki et al. | 340/754 |
| 4,812,744 | 3/1989 | Havel | 324/115 |
| 4,815,824 | 3/1989 | Sharples | 350/336 |
| 4,926,331 | 5/1990 | Windle et al. | 364/424.04 |

FOREIGN PATENT DOCUMENTS 60-107109 12/1985 Japan .

Primary Examiner—Donnie L. Crosland
Attorney, Agent, or Firm—Steven R. Janda

[57] ABSTRACT

Gauges are often used to monitor operating conditions on machines. Advantageously, such gauges are capable of indicating the level of a parameter being either above or below a reference level. The subject invention provides a sensor for producing a sensor signal having a value representative of the level of a sensed parameter. A gauge displays the level of the sensed parameter and includes a high indicating segment and a low indicating segment. An instrument receives the sensor signal and progressively illuminates the high and low indicating segments in response to the sensor signal increasing or decreasing from a reference value, respectively.

18 Claims, 6 Drawing Sheets

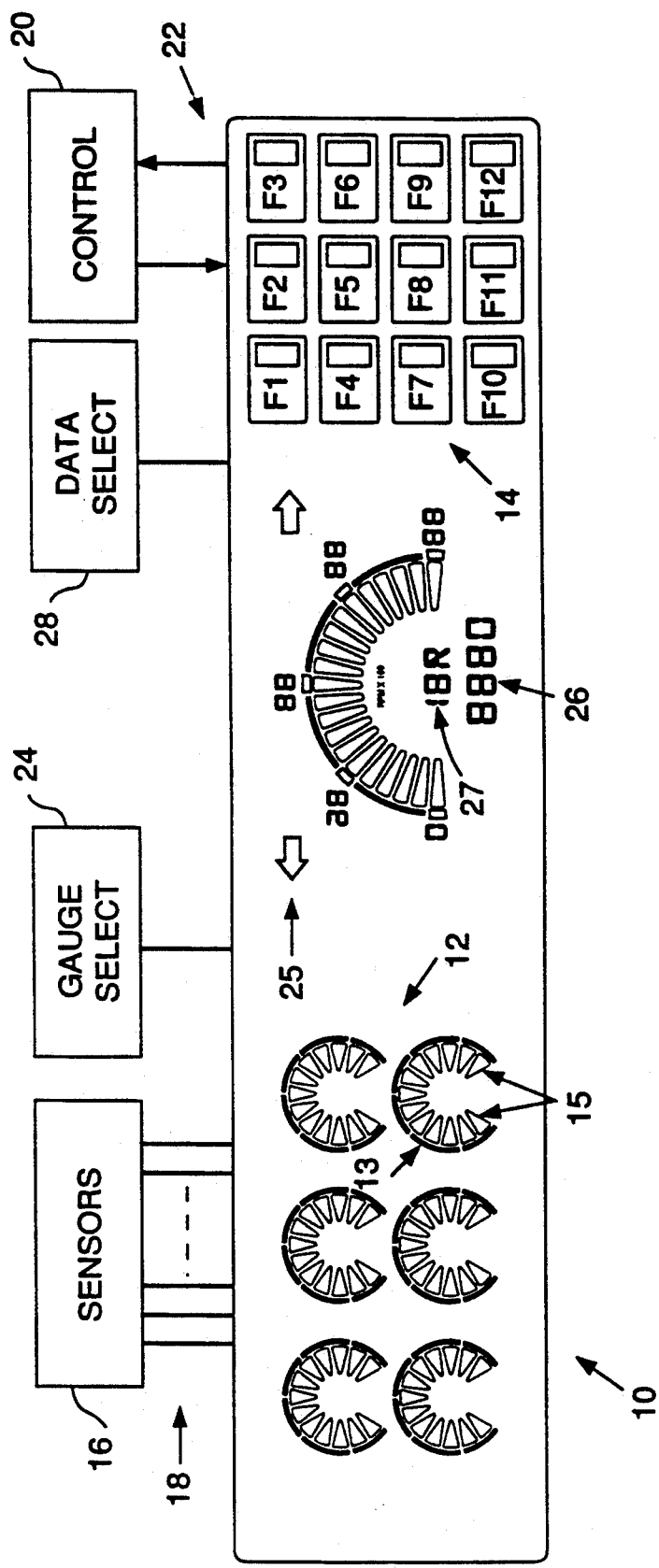

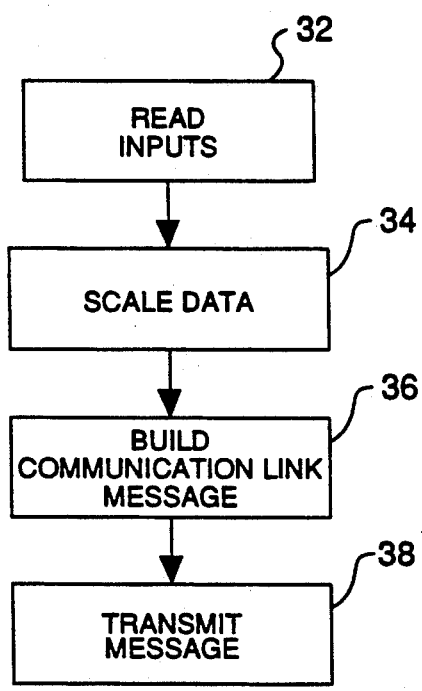
Fig_3_

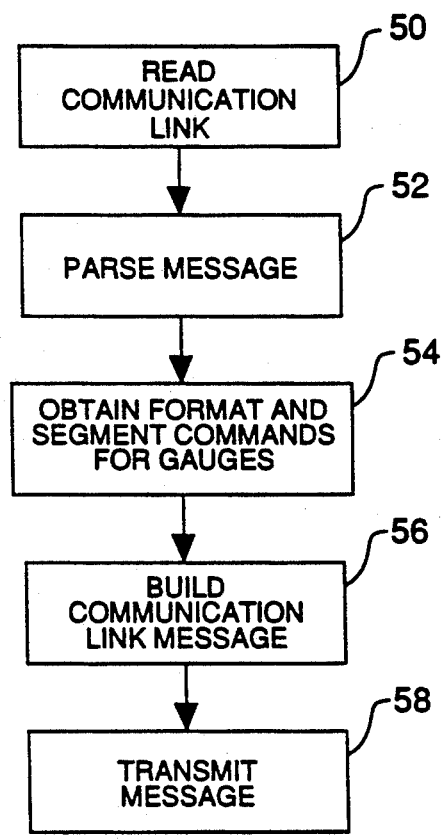

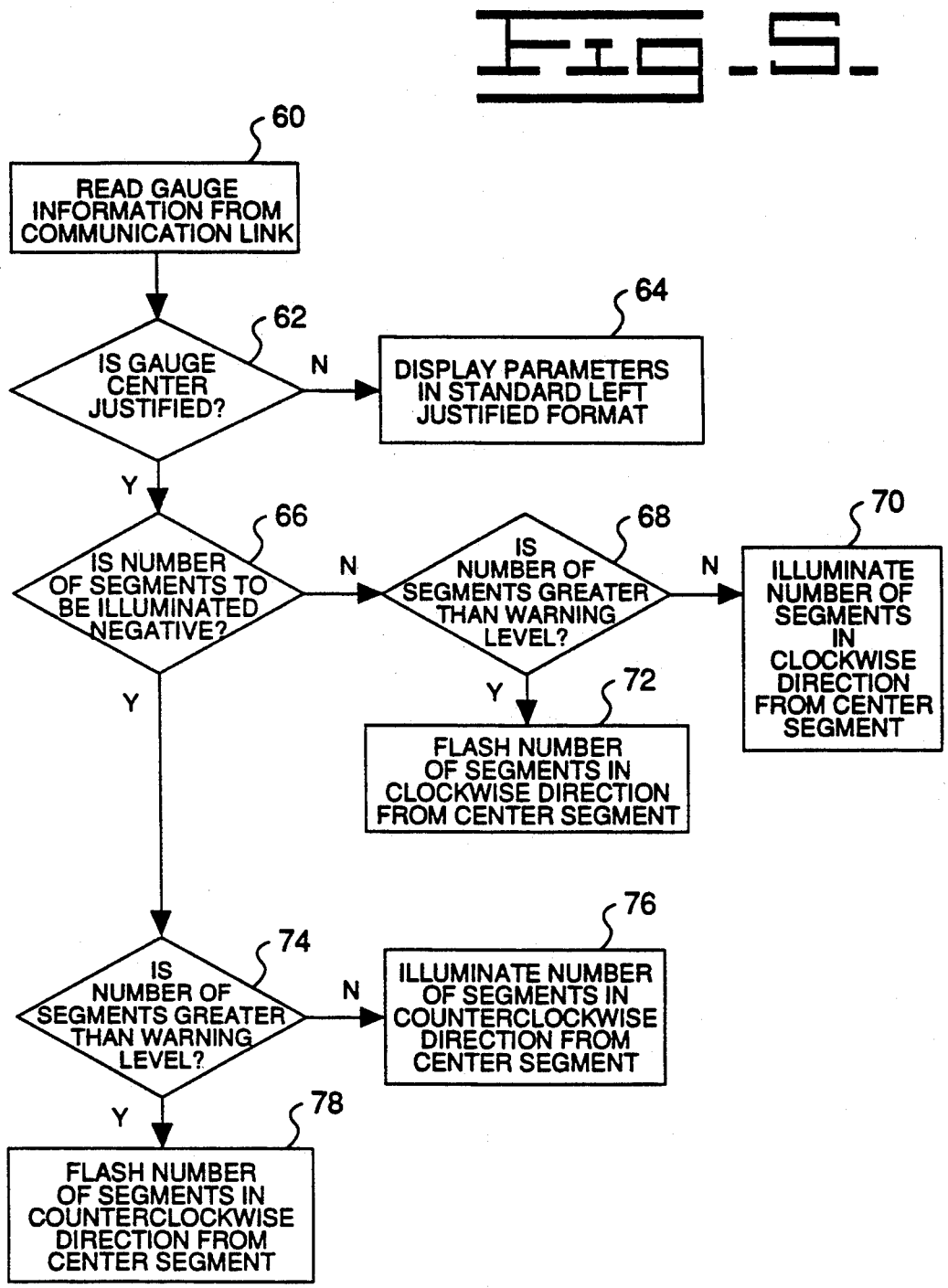

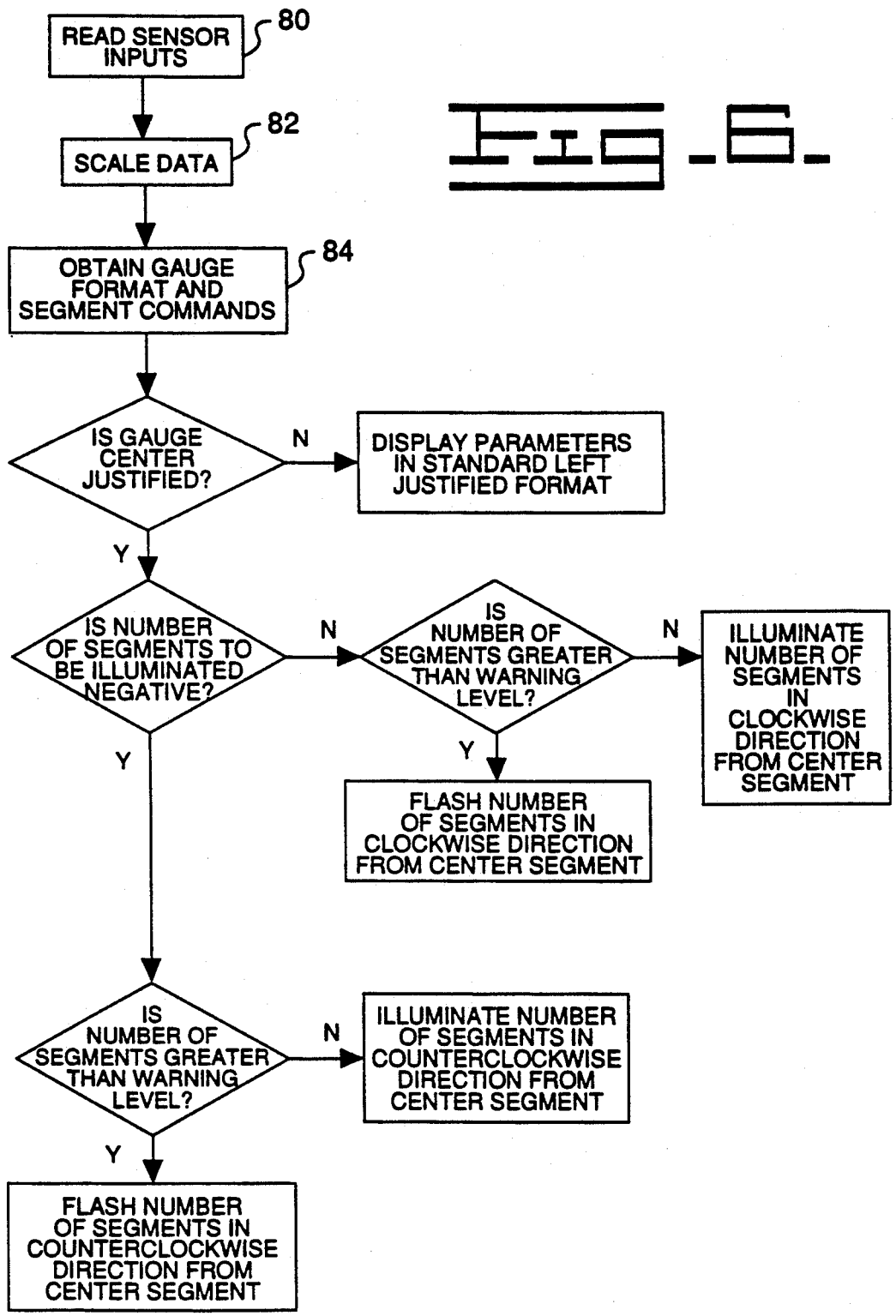

CENTER JUSTIFIED GAUGE

DESCRIPTION

1. Technical Field

The invention relates generally to the display of monitored parameter values on a gauge and, more particularly, to a method and apparatus for displaying a parameter value having both high and low warning levels.

2. Background Art

In a variety of engine-powered vehicles, instruments for monitoring and diagnosing sensor signals are employed to detect the presence of various undesirable operating conditions, such as overheating of the engine, low oil pressure, low fuel, and the like, and indicators are provided to warn the operator of such conditions.

These instruments are often designed to operate in connection with a variety of machine types and are typically connected to various sensors and switches for monitoring or controlling conditions via a wire harness and/or a communication link. In many applications, these instruments are also connected to electronic control systems, for example electronic engine controls, electronic transmission controls, and the like.

Since these instruments may be used in connection with many different machines, it is advantageous for the instruments to be as flexible as possible. Lower costs will be achieved and less warehousing space will be required if a single instrument can be manufactured which can be used in many different applications. Similarly, service time will be reduced if software changes are avoided when an instrument is moved from one machine to another.

Most prior art systems have included dedicated instruments in which the functions and conditions of the vehicle to be monitored or diagnosed, as well as the particular sensors provided on the vehicle are identified in advance Hence, the instrument is specifically designed for and hence "dedicated" to the monitoring or diagnosing of those particular vehicle functions and conditions in response to signals from the particular, pre-identified associated sensors Accordingly, such "dedicated" instruments generally cannot be readily modified in the field to accommodate different machines, different sensors and/or different conditions and functions Rather, such instruments are generally limited to use with a particular vehicle type or model for which the instrument has been designed.

However, a manufacturer of such instruments need not provide a totally new monitoring or diagnostic system for each machine or each variation in sensors or functions to be monitored or diagnosed. For example, some prior art systems have provided for standardized monitoring systems such as the system shown in U.S. Pat. No. 4,551,801, issued to Sokol on Nov. 5, 1985.

In connection with some machines, it is desirable for the instrument to display the level of parameters that should not become either too high or too low in order to prevent potentially damaging operation of the machine. Examples of parameters on an engine that should be monitored for being either too high or too low are crankcase pressure and fuel factor.

Most electronic gauges are only capable of indicating one type of warning, that is, most electronic gauges are either capable of warning the operator that a sensed parameter is too high, but not too low; or the gauge is capable of warning the operator that the sensed parameter is too low, but not too high. In these gauges, there is typically only a single warning region The invention disclosed in U.S. Pat. No. 4,038,756, issued to Smith et al. on Aug. 2, 1977, shows a gage for indicating whether a manufactured part is within tolerance The maximum and minimum allowable sensor levels, however, are clumsy to adjust and may be accidentally moved. Furthermore, such a gauge is not adaptable to use in connection with engine or vehicle monitoring systems since the amount of warning provided in the event the sensed parameter is either too high or too low is insufficient for these purposes and the degree to which the parameter is above or below the midpoint is not easily readable since only a single light is illuminated at any given time.

The present invention is directed to overcoming one or more of the problems set forth above.

DISCLOSURE OF THE INVENTION

The invention avoids the disadvantages of known instruments for monitoring operating conditions and provides an instrument having a gauge being capable of indicating the level of a sensed parameter being either above or below a reference value and indicating both a high and a low warning condition.

In one aspect of the invention, an apparatus for displaying the level of a sensed parameter is provided. A sensor produces a signal having a value representative of the level of a sensed parameter. A gauge displays the level of the sensed parameter and has a high and low indicating segments. An instrument receives the signal and progressively illuminates the high and low indicating segments in response to the signal increasing and decreasing from a reference value, respectively.

In another aspect of the invention, a method for displaying the level of a sensed parameter is provided including the steps of producing a sensor signal having a value representative of the level of a sensed parameter, displaying the level of the sensed parameter on a gauge having a high indicating segment and a low indicating segment, and receiving the sensor signal and progressively illuminating the high and low indicating segments in response to the sensor signal increasing or decreasing from a reference value, respectively.

The invention also includes other features and advantages which will become apparent from a more detailed study of the drawings and specification

BRIEF DESCRIPTION OF THE DRAWINGS

For a better understanding of the present invention, reference may be made to the accompanying drawings in which:

FIG. 1 is a diagrammatic illustration of an instrument including a preferred embodiment of the present invention;

FIG. 3 is a flow chart of an algorithm executed by the instrument in accordance with a preferred embodiment of the invention;

FIG. 4 is a flow chart of an algorithm executed by the electronic control in accordance with a preferred embodiment of the invention;

FIG. 5 is a flow chart of an algorithm executed by the instrument in accordance with a preferred embodiment of the invention; and FIG. 6 is a flow chart of an algorithm executed by the instrument in accordance with an alternative embodiment of the invention.

BEST MODE FOR CARRYING OUT THE INVENTION

Figure 2A:
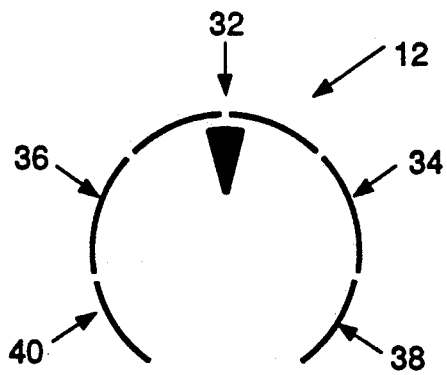
FIG. 2a is an illustration of a center justified gauge indicating that a sensed parameter is substantially at a predefined reference value.

An instrument for displaying parameter values is shown generally by the reference numeral 10 in FIG. 1. In the preferred embodiment, the instrument 10 is a computerized diagnostic and monitoring system for monitoring and displaying parameters and informing an operator by visible and/or audible indications when a warning condition exists. The instrument 10 advantageously includes a plurality of electronic gauges 12 and indicator lights 14. The gauges 12 preferably indicate the level of a plurality of sensed parameters, for example, engine RPM, oil temperature, fuel level, transmission oil temperature, and the like, and may be used in connection with any of a plurality of different machine types. Warning conditions are brought to an operator's attention by the indicator lights 14 or a flashing gauge 12. In a preferred embodiment, warning conditions of various levels are also indicated by a flashing alarm lamp and/or a horn (neither of which are shown). The indicator lights 14 are lit preferably in response to switch-type inputs being in a warning or fault condition. The instrument 10 is advantageously microprocessor based and functions in response to internal software.

The instrument 10 illustrated in FIG. 1 is sufficiently flexible to be used in connection with a number of different machines and to indicate a number of different parameters. For example, each gauge, except the central gauge indicating speedo/tacho information, is capable of indicating either a high warning condition or a low warning condition. In a preferred embodiment, the gauge 12 includes a plurality of indicating segments located in the central portion of the gauge and a plurality of warning segments including the two most clockwise oriented and the two most counter-clockwise oriented segments for indicating the high and low warning conditions, respectively.

In the event that it is desirable to indicate a parameter having high warning value, for example hydraulic oil temperature, all segments other than the two most counter-clockwise oriented segments are enabled and progressively illuminated in the clockwise direction as the sensed parameter increases from a low level to a maximum warning level. To indicate a parameter having a low warning value, for example fuel level, all segments other than the two most clockwise oriented segments are enabled. The indicating segments are illuminated to indicate the sensed parameter being at a high level and progressively disabled in the counter-clockwise direction as the sensed parameter decreases. In response to a warning condition, all or a portion of the gauge 12 associated with the warning condition is preferably caused to flash by the instrument 10. This is referred to as the left justified format.

In connection with parameters having both high and low warning levels, the gauge 12 is configured in a center justified format. The gauge 12 includes a plurality of illuminable segments, preferably of the vacuum fluorescent (VF) type. As shown in FIG. 2, a central segment 32 is disposed generally equidistant from the most clockwise and counter-clockwise portions of the gauge 12. A plurality of high indicating segments 34 are displaced in the clockwise direction from the central segment 32 and a plurality of low indicating segments 36 are displaced in the counter-clockwise direction from the central segment 32. Two high warning segments 38 are located in the extreme clockwise portion of the gauge 12 and two low warning segments 40 are located in the extreme counter-clockwise portion of the gauge 12. While two high and low warning segments 38,40 are advantageously used, only one of each of the high and low warning segments 38,40 could be used.

In the preferred embodiment, the high and low warning segments 38,40 are colored differently than the central and high and low indicating segments 32,34,36. Advantageously, the high and low warning segments 38,40 are red and the remaining segments 32,34,36 are blue or green.

Figure 2B:
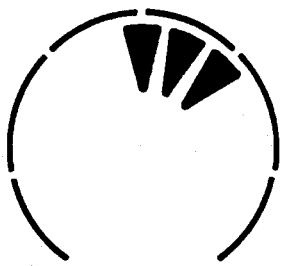
FIG. 2b is an illustration of a center justified gauge indicating that a sensed parameter is substantially above a predefined reference value.
Figure 2C:
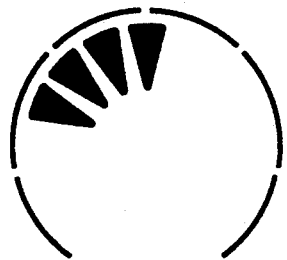
FIG. 2c is an illustration of a center justified gauge indicating that a sensed parameter is substantially below a predefined reference value.

With reference to FIGS. 2a–e, the operation of a center justified gauge is described. For the parameter level being displayed on the gauge 12, a reference value is established as described below. When the sensed parameter level is substantially at the reference value, only the central segment 32 is illuminated. As shown in FIG. 2b, when the level of the sensed parameter increases from the reference value, the high indicating segments 34 are progressively illuminated in the clockwise direction. The more high indicating segments 34 are illuminated; the greater is the level of the sensed parameter above the reference value. Referring now to FIG. 2c, when the level of the sensed parameter decreases below the level of the reference value, the low indicating segments 36 are progressively illuminated in the counter-clockwise direction. The more low indicating segments 36 are illuminated; the farther is the level of the sensed parameter below the reference value.

Figure 2D:
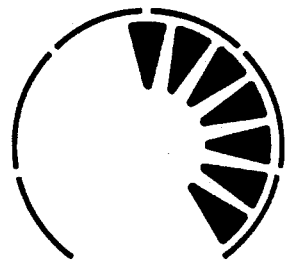
FIG. 2d is an illustration of a center justified gauge indicating that a sensed parameter is substantially above a predefined high warning level.

For the parameter level being displayed on the gauge 12, high and low warning values are established as described below. The behavior of the gauge 12 when the sensed parameter is above or below the high and low warning values, respectively, is best described in connection with FIGS. 2d–e. Once the level of the sensed parameter exceeds the high warning value, all of the high indicating segments 34 and one of the high warning segments 38 are caused to flash. As the level of the sensed parameter increases even farther, the second of the high warning segments 38 is also caused to flash. As shown in FIG. 2d, the sensed parameter has increased to a level at which the central segment 32, all of the high indicating segments 34 and both of the high warning segments 38 are all caused to flash.

Figure 2E:
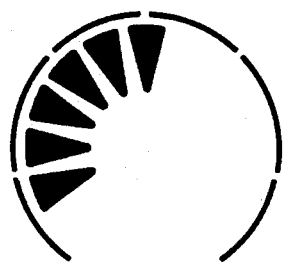
FIG. 2e is an illustration of a center justified gauge indicating that a sensed parameter is substantially below a predefined low warning level.

Once the level of the sensed parameter decreases below the low warning value, all of the low indicating segments 36 and one of the low warning segments 40 are caused to flash. As the level of the sensed parameter decreases even farther, the second of the low warning segments 40 is also caused to flash. As shown in FIG. 2e, the sensed parameter has decreased to a level at which the central segment 32, all of the low indicating segments 36 and only one of the low warning segments 40 are all caused to flash. If the sensed parameter decreased even farther, the second low warning segment would also be caused to flash.

In addition to the flashing segments, the warning horn or the alarm lamp could be activated in the event that the level of the sensed parameter exceeded the high or low warning level. Similarly, the outline segments of the gauge 12 could also be flashed.

Advantageously, each machine type has an identification code to be delivered to the instrument 10 which responsively reconfigures itself in response to the layout chosen by the designer of that machine. In response to the identification code, the instrument 10 determines that the sensor information should be sent to the electronic control 20 via the communication link 22 and also determines the parameter monitored at each input and the signal filtering, debounce, scaling, or averaging characteristics associated with each input.

The instrument 10 is connected to each of a plurality of sensors 16 by wires in a wire harness 18. When used in connection with some machine types, the instrument 10 is also connected to one or more electronic controls 20 via a communication link 22. In the preferred embodiment, the communication link 22 is a two-way serial communication link on which the instrument 10 and electronic control 20 can both transmit and receive information.

A gauge selecting means 24 is connected to the instrument 10 to select the parameter values to be displayed on the plurality of gauges 12. The gauge selecting means 24 is preferably a toggle switch of a type well-known in the art.

In the preferred embodiment, there are a first group and a second group of parameters to be displayed on the gauges 12. However, it should be understood that the invention is not limited to only the first and second groups of parameters. Additional groupings may be added or only a single group may be used without deviating from the invention.

Gauge selection lights 25 are advantageously provided to indicate which of the first and second groups of parameters are being indicated by the gauges 12. In the preferred embodiment, two gauge selection lights 25 are provided in the form of directional indicators; however, the number and form of the gauge selection lights 25 should in no way limit the scope of the invention.

A digital display 26 is provided for indicating, advantageously in engineering units, the level of a parameter being sensed by one of the sensors 16. The digital display 26 may also indicate a percentage of a reference level of the indicated parameter, for example a maximum or minimum value. An identification display 27 is advantageously disposed adjacent the digital display 26. The identification display 27 indicates which parameter is being displayed in digital form. Preferably, each parameter is associated with a particular numerical identifier which is displayed on the identification display 27 whenever the value of that parameter is displayed on the digital display 26. For example, if the gauges were numbered, the number of the gauge 12 associated with the same parameter being displayed on the digital display 26 would be displayed on the identification display 27. Alternatively, the all or a portion of the gauge associated with the parameter displayed on the digital display 26 is caused to flash.

A data selecting means 28 is connected to the instrument 10 to select the parameter to be indicated on the digital display 26. The data selecting means 28 is preferably a switch of a type well-known in the art. As the data selecting means 28 is activated, the digital display 26 scrolls through each of the sensed parameters. Advantageously, a decal or card (not shown), indicating the parameters associated with each of the gauge selection lights 25 and the numerical identifiers to be displayed on the identification display 27 for each parameter, is located near the instrument 10 for easy reference by the operator.

Advantageously, a warning indicator light 30 is provided to inform an operator that a warning condition exists on a sensed parameter that is not currently being indicated by a gauge. For example, if oil pressure was in the second group of parameters but the first group of parameters was currently being displayed, the warning indicator light 30 would be illuminated if the oil pressure reached a warning level. Alternatively, the instrument could automatically switch to the group of parameters including the parameter having the warning condition. Advantageously, the warning indicator light 30 is one of the indicator lights 14.

Other than the warning indicator light 30, the indicator lights 14 indicate various system faults or warning conditions. In the preferred embodiment, one or more of the indicator lights 14 are associated with warning conditions of parameters indicated by the gauges 12.

The instrument 10 preferably performs some processing of the sensor signals and scales the signals received from pulse-width modulation type sensors and frequency based sensors in a manner well-known in the art. The instrument 10 produces instrument signals identifying each sensed parameter and the level of the associated sensor signal.

In a preferred embodiment of the invention, the instrument 10 executes the algorithm illustrated in FIG. 3. The instrument 10 reads 42 the sensor signals from the wire harness 18 Since the sensor signals may be in the form of pulse-width modulated signals, frequency signals, or switch-type binary signals, the instrument 10 scales 44 the inputs to a microprocessor readable form in manners well-known in the art. For example, if the value of the parameter is to be represented by a binary signal having a range of values from 0–255 and a pulse-width modulated signal for a parameter is received having a 70% duty-cycle, the instrument 10 may assign the binary number 179 to that parameter if a linear characteristic is desired. In the preferred embodiment, the scaling associated with each parameter is varied in accordance with the desires of the system designers. The scaling may be linear, logarithmic, or any other desirable characteristic.

Similarly, the instrument 10 receives signals from the switch-type sensors and the gauge select means 24 and data select means 28. The data associated with these inputs are similar to the other types of sensors, but generally no scaling is required.

The instrument 10 then builds 46 an instrument signal for the communication link 22 with the scaled parameter data and the switch-type data. In the preferred embodiment, a serial data series is built including a module identifier corresponding to the electronic control 20 to receive the data, an identifier for each scaled parameter to be transmitted over the communication link 22, the scaled data representing the level of the parameter associated with each identifier, the status of the data select means 28, the status of the gauge select means 24, and the status of each switch-type input. Once the instrument signal is built, the instrument 10 transmits 48 the message over the communication link 22.

In a preferred embodiment of the invention, the electronic control 20 executes the algorithm illustrated in FIG. 4. The electronic control 20 reads 50 the instrument signal off the communication link 22 and parses 52 the serial message into the individual pieces associated with each parameter.

The status of the gauge select means 24 determines which of the parameters are displayed on each of the gauges. Since in the preferred embodiment, there are more parameters to be displayed than the number of available gauges, only a portion of the parameters are displayed at any given time. In the preferred embodiment the gauge select means 24 is a toggle switch and the parameters to be displayed are divided into two groups. In response to the gauge selecting means 24 having one of two states, the electronic control 20 obtains display commands for the selected group of gauges 12.

For each parameter, the electronic control 20 obtains 54 format and display commands in response to the parameter values, the data selecting means 28 status, the gauge selecting means 24 status, and design choices made by the system designers regarding the display format for each sensed parameter.

In response to the scaled data from the pulse-width modulated and frequency sensors and the status of the gauge selecting means 24, the electronic control 20 determines which segments are to be illuminated on each gauge. In the preferred embodiment, the electronic control 20 includes a memory device (not shown) including a plurality of stored parameter values corresponding to the each possible magnitude of the scaled data received from the instrument 10 and an indication of whether each parameter is to be displayed in the center justified format. Both the format and the stored values for each parameter are retrieved in response to receiving the instrument signal.

In accordance with the above example, suppose that the scaled data received from the instrument and associated with the crankcase pressure in an engine is 179 and that the crankcase pressure is to be displayed in the center justified format. The electronic control 20 retrieves the parameter value corresponding to 179 for crankcase pressure. For the purposes of this example, assume that the retrieved value is 120 kPa and that a predefined range of values for crankcase pressure has been chosen by the system designers to be 50–150 kPa. The range is chosen to include the parameter levels at which a warning should be indicated.

The electronic control 20 then uses an equation, derived in response to the predefined range, the number of available segments, the reference value, and the high and low warning values, to determine the number of segments to be illuminated to indicate a crankcase pressure of 120 kPa. For example, the following equation may be used.

$$Y = 0.2X - 20$$

where:

X is the retrieved parameter value; and
Y is the segment number.

Thus in operation, if X=120, the segment number is +4; if X=100, the segment number is 0; if X=70, the segment number is −6; and so forth. In the preferred embodiment, the reference value is substantially equal to the parameter value causing the segment number to be equal to 0. If the absolute value of the segment number is greater than or equal to 5, the parameter level is deemed to have exceeded the high or low warning level.

To more clearly illustrate the display associated with the positive and negative segment numbers, reference is again made to FIGS. 2a–e. In FIG. 2a, the illumination of the central segment 32 corresponds to the segment number 0 and the level of the sensed parameter is shown to be substantially equal to the reference value. The display in FIG. b corresponds to a segment number of +2. The display in FIG. c corresponds to a segment number of −3. The display in FIG. d corresponds to a segment number of +6 and the display in FIG. e corresponds to a segment number of −5. In both of FIGS. 2d and 2e, the indicating and warning segments are caused to flash.

The equation is advantageously linear, however, the equation may be non-linear without deviation from the present invention. In the preferred embodiment, the solution to the equation is rounded up to obtain the proper number of segments to illuminate. Alternatively, a look-up table of a type well-known in the art could be used in place of the equation.

In addition, a message is created for turning on one of the gauge selection lights 25 in response to the status of the gauge select means 24. In the preferred embodiment, each of the gauge selection lights 25 are associated with a group of sensed parameters to provide the operator with an indication of which parameters are being displayed by the gauges 12.

Similarly, the status of the data selecting means 28 determines which of the parameters are displayed by the digital display 26. Since only one parameter may be displayed in digital form at any given time, the data selecting means 28 allows the operator to choose which parameter is displayed. In the preferred embodiment, there are a predefined number of parameters to be displayed that each have a numerical identifier to be displayed on the identification display 27. The parameters are arranged in a numerical order and each time the data selecting means 28 is activated the electronic control 20 changes the digitally displayed data to the next parameter in numerical order. Since the numerical identifier is displayed on the identification display 27, the operator is aware of which parameter is being displayed by the digital display 26. Thus the operator scrolls through the list of available parameters through activation of the data selecting means 28. Advantageously, a decal or card (not shown) indicating the parameters associated with each of the gauge selection lights 25 and the identifiers on the identification display 27 is located near the instrument 10 for easy reference by the operator.

In response to the switch-type inputs, the electronic control 20 determines whether and which indicator lights 14 should be illuminated in a manner well-known in the art. For example, if the data message associated with a particular switch-type input indicates that the switch-type sensor has been activated in response to a fault condition, warning condition, or the like, the indicator light 14 associated with that sensor is illuminated. The electronic control 20 also typically performs other control functions, such as engine or transmission control functions, in response to the parameter values and switch-type inputs, but these functions form no part of the present invention and will not be further described herein.

In the preferred embodiment, if a warning condition exists on a gauge 12 not being currently displayed, the electronic control 20 produces a command to illuminate the warning indicator light 30. Thus, the operator is advised that he should change the status of the gauge selecting means 24 to indicate the parameter having the warning condition.

The electronic control 20 builds 56 a control signal that is a serial message including all of the relevant display information in a manner similar to that described above. The control signal includes a module identifier corresponding to the instrument, an output identifier for each display, i.e. gauge 12, digital display 26, identification display 27, indicator light 14, and gauge selection light 25, as well as the commands for each display to indicate the selected parameter levels and warning or fault conditions. In addition, the control signal includes the indication of whether each gauge 12 should display the associated parameter in the center justified format, as selected by the system designer. The electronic control 20 then transmits 58 the control signal on the communication link 22.

In a preferred embodiment of the invention, the instrument 10 executes the algorithm illustrated in FIG. 5. The instrument 10 reads 60 the control signal off the communication link 22 and parses the serial message into the individual pieces associated with each display.

If the control signal indicates 62 that the gauge is not to be center justified, then the parameter is displayed 64 in the ordinary left justified format. If the parameter is to be displayed in the center justified format, the instrument 10 determines 66 whether the segment number is positive or negative.

In the preferred embodiment, if the absolute value of the segment number is 5 or greater, the instrument 10 determines 68,74 that the number of segments exceeds the warning level. If the number of segments is positive and less than 5, then the center segment 32 and that number of segments will be illuminated 70 in the clockwise direction. If the number of segments is positive and equal to or greater than 5, then that number of segments in the clockwise direction and the center segment will be caused to flash 72.

If the number of segments is negative and the absolute value is less than 5, then the center segment 32 and that number of segments will be illuminated 76 in the counter-clockwise direction. If the number of segments is negative and the absolute value is equal to or greater than 5, then that number of segments in the counter-clockwise direction and the center segment will be caused to flash 78.

In the preferred embodiment, the communications described in connection with FIGS. 2, 3, and 4 occur approximately four times every second. It should be understood, however, that more or less frequent communications could be used.

It should be understood, however, that the processing performed by the electronic control 20 could be performed within the instrument 10, thus negating the need for the above described communications between the instrument 10 and the electronic control 20. In such a case, the instrument 10 would execute the algorithm shown in FIG. 6.

The instrument 10 reads 80 the sensor signals from the wire harness 18. Since the sensor signals may be in the form of pulse-width modulated signals, frequency signals, or switch-type binary signals, the instrument 10 scales 82 the inputs to a microprocessor readable form in manners well-known in the art.

Similarly, the instrument 10 receives signals from the switch-type sensors and the gauge select means 24 and data select means 28. The data associated with these inputs are similar to the other types of sensors, but generally no scaling is required.

The instrument 10 then performs the functions described above in connection with block 54 of FIG. 4 wherein the segment format and display information is obtained for each of the sensed parameters. The instrument 10 lastly performs substantially the algorithm illustrated in FIG. 5 absent the step of reading the gauge information off the communication link. Thus, the instrument 10 performs the functions of the present invention without the need to transmit the sensed parameter data to an electronic control 20 for processing.

Industrial Applicability

The operation of an embodiment of the present invention is best described in relation to its use on an engine or vehicle. The invention allows one or more sensed parameters to be displayed in a center justified format such that a warning condition is indicated if the sensed parameter becomes either too high or too low.

In the preferred embodiment, sensor data representative of a plurality of parameter values is received by the instrument 10 via a wire harness 18. The instrument 10 scales and processes the signals to form instrument signals. In response to the identity of the sensed parameter, the system determines whether the parameter should be displayed in the center justified format. Additionally, the number of segments to be displayed is determined in response to the magnitude of the sensed parameter.

If the parameter is to be displayed in the center justified format, the center segment 32 of the gauge 12 is illuminated. In response to the level of the sensed parameter increasing from a reference value, a positive number corresponding to the number of segments to be illuminated in the clockwise direction from the center segment is assigned to that gauge 12. Thus, the high indicating segments 34 are progressively illuminated in response to the level of the sensed parameter increasing from the reference value. In response to the level of the sensed parameter decreasing from the reference value, a negative number corresponding to the number of segments to be illuminated in the counter-clockwise direction from the center segment is assigned to that gauge 12. Thus, the low indicating segments 36 are progressively illuminated in response to the level of the sensed parameter decreasing below the reference value.

If greater than a certain number of segments in the clockwise direction, the parameter has exceeded the high warning value and the center 32 and high indicating segments 34 as well as at least one of the high warning segments 38 will flash to indicate that the sensed parameter has exceeded the high warning value. Similarly, if greater than a certain number of segments in the counter-clockwise direction is obtained, the parameter has exceeded the low warning value and the center 32 and low indicating segments 36 as well as at least one of the low warning segments 40 will flash to indicate that the sensed parameter has exceeded the low warning level.

Any specific values used in the above descriptions should be viewed as exemplary only and not as limitations. Other aspects, objects, and advantages of this invention can be obtained from a study of the drawings, the disclosure, and the appended claims.

We claim:

1. An apparatus for displaying the level of a sensed parameter in a center justified format, comprising:
   a sensor means for producing a sensor signal having a value representative of the level of a sensed parameter, said sensor signal having a reference value;
   a gauge means for displaying the level of said sensed parameter, said gauge means having a plurality of high indicating segments, a plurality of low indicating segments, and a central segment, said plurality high and low indicating segments and said central segment being illuminable; and
   instrument means for receiving said sensor signal and responsively displaying the level of the sensed parameter in the center justified format by illuminating said central segment and progressively illuminating said plurality of high and low indicating segments in response to the value of said sensor signal substantially increasing and decreasing from said reference value, respectively.

2. An apparatus, as set forth in claim 1, including high and low warning segments being illuminable and wherein said sensor signal has a high warning value and a low warning value and said instrument means illuminates said high and low warning segments in response to said sensor signal having a value above said high warning value and below said low warning value, respectively.

3. An apparatus, as set forth in claim 1, wherein said sensor signal has a high warning value and a low warning value and said instrument means flashes said high or low indicating segments in response to said sensor signal having a value greater than said high warning value or less than said low warning value, respectively.

4. An apparatus, as set forth in claim 1, including means for identifying the sensed parameter and responsively selecting a range of levels of the sensed parameter to be associated with each of the high and low indicating segments.

5. An apparatus, as set forth in claim 2, including means for identifying the sensed parameter and wherein said instrument means selects the high and low warning values in response to the identity of the sensed parameter.

6. An apparatus, as set forth in claim 1, wherein said instrument means includes means for producing a parameter identifier and said instrument displays the level of the sensed parameter on the gauge means in the center justified format in response to said parameter identifier.

7. An apparatus, as set forth in claim 6, wherein the range of levels of the sensed parameter associated with each of the high and low indicating segments are selected in response to said parameter identifier.

8. An apparatus, as set forth in claim 7, wherein said instrument means selects high and low warning values in response to said parameter identifier.

9. An apparatus for displaying the level of a sensed parameter in a center justified format, comprising:
   a sensor means for producing a sensor signal having a value representative of the level of a sensed parameter, said sensor signal having a reference value;
   a gauge means for displaying the level of said sensed parameter, said gauge means having a plurality of high indicating segments, a plurality of low indicating segments, and a central segment, said plurality of high and low indicating segments and said central segment being illuminable; and
   instrument means for receiving said sensor signal and responsively illuminating one or more of said high and low indicating and central segments in a display format, said instrument means including means for identifying the sensed parameter and responsively causing said instrument means to display the level of the sensed parameter on said gauge means in the center justified format wherein said instrument illuminates said central segment and progressively illuminates said plurality of high and low indicating segments in response to the value of said sensor signal substantially increasing and decreasing from said reference value, respectively.

10. An apparatus, as set forth in claim 9, wherein each of the high and low indicating segments are associated with a range of levels of the sensed parameter and said means for identifying the sensed parameter responsively selects a range of levels of the sensed parameter to be associated with each of the high and low indicating segments.

11. An apparatus, as set forth in claim 9, including high and low warning values and said means for identifying the sensed parameter responsively selects a level of the sensed parameter to be associated with each of said high and low warning values.

12. An apparatus for displaying the level of a sensed parameter in a center justified format, comprising:
   a sensor means for producing a sensor signal having a value representative of the level of a sensed parameter, said sensor signal having a reference value;
   a gauge means for displaying the level of said sensed parameter, said gauge means having a plurality of high indicating segments, a plurality of low indicating segments, and a central segment, said plurality of high and low indicating segments and said central segment being illuminable; each of said segments being associated with a range of values of the sensor signal; and
   instrument means for receiving said sensor signal and illuminating said segments in response to the value of said sensor signal, said instrument means including means for identifying the sensed parameter and responsively selecting the range of levels of the sensed parameter associated with each of said segments.

13. An apparatus, as set forth in claim 12, wherein said means for identifying the sensed parameter includes means for producing a parameter identifier and said instrument means responsively causes said gauge means to display the level of the sensed parameter in a center justified format wherein said instrument illuminates a central segment and progressively illuminates a plurality of high and low indicating segments in response to the value of said sensor signal substantially increasing and decreasing from said reference value, respectively.

14. A method for displaying the level of a sensed parameter, comprising the steps of:
   producing a sensor signal having a value representative of the level of a sensed parameter;
   displaying the level of the sensed parameter on a gauge having a central segment, plurality of high indicating segments, and a plurality of low indicating segments; and
   receiving the sensor signal and responsively illuminating the central segment and progressively illuminating the plurality of high and low indicating segments in response to the sensor signal increasing or decreasing from a reference value, respectively.

15. A method, as set forth in claim 14, including the steps of illuminating high and low warning segments in response to the sensor signal having a value above a high warning value and below a low warning value, respectively.

16. A method, as set forth in claim 14, including the step of flashing the high and low indicating segments in response to the sensor signal having a value greater than a high warning value or less than a low warning value, respectively.

17. A method, as set forth in claim 14, including the steps of identifying the sensed parameter and responsively selecting a range of levels of the sensed parameter to be associated with each of the high and low indicating segments.

18. A method, as set forth in claim 17, including the step of selecting high and low warning values in response to the identity of the sensed parameter.

* * * * *